UNITED STATES PATENT OFFICE.

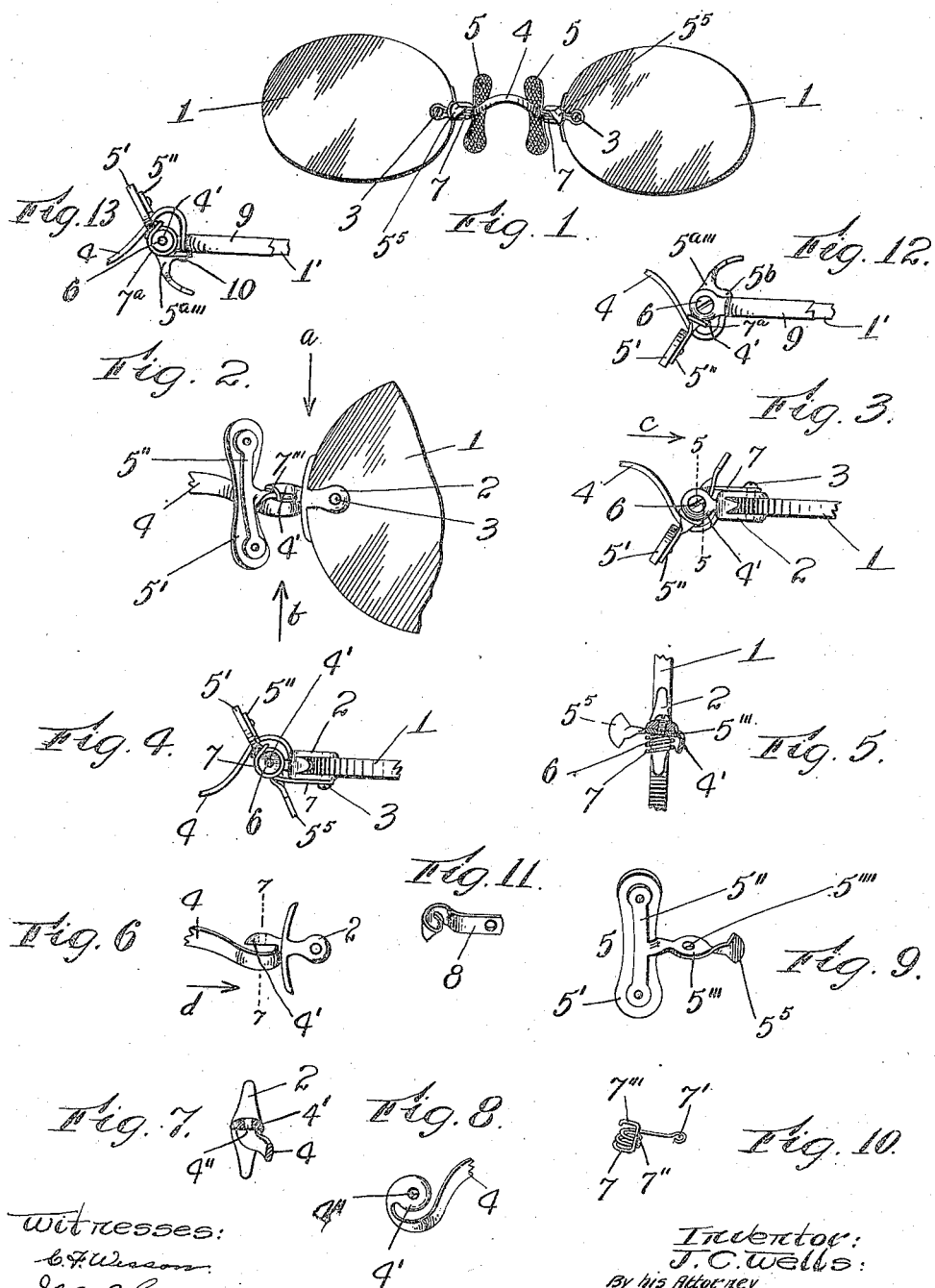

JOEL C. WELLS, OF SOUTHBRIDGE, MASSACHUSETTS.

EYEGLASSES.

No. 813,030.

Specification of Letters Patent.

Patented Feb. 20, 1906.

Application filed April 16, 1903. Serial No. 152,827.

*To all whom it may concern:*

Be it known that I, JOEL C. WELLS, a citizen of the United States, residing at Southbridge, in the county of Worcester and State of Massachusetts, have invented certain new and useful Improvements in Eyeglasses, of which the following is a specification.

My invention relates to eyeglasses, and to that class of eyeglasses which have a substantially rigid nose-bridge connecting the lenses and pivotally - supported nose pieces or guards; and my invention more particularly relates to improvements in the construction of the nose-bridge and the spring which acts on the nose-guards to cause them to press on the nose of the wearer.

The object of my invention is to improve upon and simplify the construction of the bridge and the torsion-spring, which actuates the nose-guards.

In my improvements the nose-bridge is preferably made of flattened metal or oval shape in cross-section and preferably has its ends bent around or curved and the extreme ends bent to extend in a plane at substantially right angles to the plane of the lenses and preferably swaged or compressed to form a flat surface for the flat portion of the supporting-arm of the nose-guard and provided with a hole to receive the end of the screw or rivet which attaches the supporting-arm of the nose-guard to its support and forms the pivot on which it moves. The portion of the nose-bridge at each end adjoining the extreme ends, which are bent, as above described, is preferably soldered to the outer edge or surface of the lens strap or loop, which is secured to the inner end of and holds the lens in case of rimless eyeglasses or to the frame in the case of eyeglasses with frames, and, further, in my improvements the spring which actuates each nose-guard and causes it to press against the nose of the wearer does not encircle the pivot screw or rivet of the supporting-arm of the nose-guard, as is customary, but extends on the outside of the screw or rivet and is entirely independent thereof and may be held in proper position relatively to the nose-bridge and nose-guard to actuate the nose-guard by the screw which secures the lens strap or loop to the inner edge of the lens in case of rimless eyeglasses, said screw passing through an eye formed in the extended end of said spring, the other end of said spring being bent to form a loop which engages the supporting pivoted arm of the nose-guard. In case of frame-eyeglasses one end of the nose-guard spring may engage a pin or stud on the frame.

My improved spring for the nose-guard being independent of the nose - guard pivot screw or rivet is readily detached and removed without removing said pivot-screw.

In connection with my improvements any well-known style of nose-guard may be used, and there will be an arm connected with the nose-guard and projecting from the front side of the lenses to be engaged by the user and moved to separate or open the nose-guards preparatory to placing the eyeglasses in position on the nose.

Referring to the drawings, Figure 1 is a front view of rimless eyeglasses embodying my improvements. Fig. 2 is a rear view of one end of the nose-bridge, a nose-guard, and a portion of the lens. Fig. 3 is a top or plan view of the parts shown in Fig. 2 looking in the direction of arrow *a*, same figure. Fig. 4 is a bottom or under side view of the parts shown in Fig. 2 looking in the direction of arrow *b*, same figure. Fig. 5 is a section on line 5 5, Fig. 3, looking in the direction of arrow *c*, same figure. Fig. 6 is a rear view of one end of the nose-bridge and the lens-strap to which it is attached. Fig. 7 is a section on line 7 7, Fig. 6, looking in the direction of arrow *d*, same figure. Fig. 8 is a perspective view of one end of the nose-bridge detached. Fig. 9 is a rear view of the nose-guard detached. Fig. 10 is a perspective view of the nose-guard spring shown in Fig. 3 detached. Fig. 11 shows a modified construction of the spring shown in Fig. 10. Fig. 12 corresponds to Fig. 3, but shows a modified construction on a frame-eyeglass; and Fig. 13 corresponds to Fig. 4, but shows a modified construction on a frame-eyeglass. Figs. 2 to 13, inclusive, are shown on an enlarged scale.

In the accompanying drawings, 1 represents the lenses, in this instance shown rimless.

2 represents the lens straps or loops of the ordinary shape and construction, which extend over the inner edge of the lenses 1 and are secured thereto by a screw 3, as is customary.

I will now describe my improvements.

The nose-bridge 4 is preferably made of flattened metal or oval in cross-section, and each end of the bridge 4 is preferably bent or curved around outwardly or toward the front side of the glasses, and the extreme ends 4' are bent or turned to extend in a plane substantially at right angles to the plane of the lenses, as shown. The ends 4' are flattened or swaged to form, preferably, a rounded end (see Fig. 8) with a flat surface for the pivot portion of the supporting-arm of the nose-guard and a hole 4'' in the end to receive the end of the pivot screw or rivet of the supporting-arm of the nose-guard. The ends of the nose-bridge 4 at their curved portion are secured to the outer edge of the lens-strap 2 by solder or to the frame in case of a frame-eyeglass. (Shown in Figs. 12 and 13.) If preferred, the extreme ends 4' of the nose-bridge 4 may be made separate from the main part of the bridge as a separate lug or projection and soldered to the lens-strap or to the frame.

The nose-guard may be of any usual and well-known construction and shape. In this instance the nose-guard 5 has the bearing or nose-engaging surface 5' and the metal back 5'' riveted thereto and having a projecting arm 5''' extending out from one edge at the central portion and bent edgewise at its middle portion and flattened and provided with a hole 5'''' therein to form an attaching-surface for the nose-guard 5 and be pivotally secured to the end 4' of the nose-bridge 4 by a screw 6 or a rivet. The free end 5ᵃ of the supporting-arm 5''' extends beyond the pivot-point of said arm and forms an engaging surface at the front of the glasses for separating or moving apart the nose-guards.

The spring 7, which actuates the nose-guards, is preferably of round wire and is preferably wound spirally for one or more coils and has one end extended and formed with an eye 7' therein, which is adapted to extend in this instance over the front side of the lens-strap 2 and to receive the lens-strap screw 3, which secures and holds the spring 7 by holding the eye 7' therein between the end of the lens-strap 2 and the head of the screw 3. The other free end of the spring 7 is bent to form a straight portion 7''', which bears against the edge of the supporting-arm 5''' of the nose-guard 5 and is also bent to form a loop 7'''', which extends over the upper side of the supporting-arm 5''' of the nose-guard 5, as shown in Fig. 3. The coil part of the nose-guard spring 7 extends on the outside of the pivot screw or rivet 6 of the supporting-arm 5''' of the nose-guard 5 and is entirely independent of said screw, being held in place by the lens-strap screw 3 passing through the eye 7' in one end of the spring 7, as above described. The spring 7 is readily detached and removed by removing the lens-strap screw 3, for the loop end 7'''' of the spring 7 only extends over and is not attached to the supporting-arm 5''' of the nose-guard 5.

It will be understood that the details of construction of my improvements may be varied, if desired, and any well-known style of nose-guard may be used in place of the one shown and described herein.

Instead of the spring 7 shown and above described a spring 8, Fig. 11, of flat metal may be used or a similarly-formed spring of round metal.

In Figs. 12 and 13 is shown a modified construction. In these figures the lens 1' has a frame 9 thereon, and there is a pin or stud 10 on the frame around which one end of the spring 7ᵃ is bent to hold said spring. The nose-guard-supporting arm 5ᵃ''' has a projection 5ᵇ thereon to engage the frame 9 and limit the pivotal motion of said arm 5ᵃ'''.

The advantage of having the coil part of the spring 7 extend in the same vertical plane as the screw or rivet of the nose-guard will be readily appreciated by those skilled in the art. In this position the spring is securely held in place by the lens-screw passing through the eye 7' on the extended end of the spring, and the center of the coil being in alinement with the center of the pivot of the nose-guard the coil winds upon itself in the movement of the nose-guard without strain in any other direction. Furthermore, the location of the coiled part of the spring in the same vertical plane as the pivot-screw of the nose-guard makes the spring more inconspicuous and also gives the best possible spring action for the nose-guard. The shape of the coil-spring and its manner of attachment makes the least expensive spring that can be used and one that is not liable to break or become inoperative.

Having thus described my invention, what I claim as new, and desire to secure by Letters Patent, is—

1. In eyeglass-mountings, the combination with the nose-bridge, the nose-guards pivotally supported at the ends of the nose-bridge, and screws or rivets for pivotally supporting the nose-guards, of a coil-spring for each nose-guard, having the coiled part in line with, and extending in the same vertical plane as said screws or rivets, and supported independently of the support of the nose-guard, and held at one end, and engaging the nose-guard at its other end, substantially as shown and described.

2. In eyeglasses, the combination with the lens straps, or frames, a nose-bridge secured thereto and having its ends curved or bent, and the extreme ends bent to extend at right angles to the plane of the lenses, and nose-guards having a supporting-arm pivotally attached to said ends by screws or rivets, of a spring for each nose-guard, independent of the pivot screw or rivet of the nose-guard, and comprising one or more coils, a projecting end to be secured to the lens strap or frame, and an end to engage the nose-guard or its supporting-arm, substantially as shown and described.

3. In eyeglasses, the combination with the lens straps or frames, a nose-bridge secured thereto, and nose-guards having a supporting-arm pivotally attached by a screw or rivet, and an engaging end extending beyond said screw or rivet, of a spring for each nose-guard, independent of said screw or rivet and located at one end thereof, and having the coiled part in line with, and extending in the same vertical plane as said screw or rivet, and having projecting ends, one secured to the lens strap or frame, and the other engaging the nose-guard-supporting arm, substantially as shown and described.

JOEL C. WELLS.

Witnesses:
CHANNING M. WELLS,
BENAJAH L. BUGBEE.